United States Patent Office 3,078,211
Patented Feb. 19, 1963

3,078,211
SABADILLA SEED INSECTICIDE
John R. Allison, Whittier, Calif., assignor to Leffingwell Chemical Company, Whittier, Calif., a corporation of California
No Drawing. Continuation of application Ser. No. 29,558, May 17, 1960. This application Apr. 5, 1962, Ser. No. 185,230
2 Claims. (Cl. 167—24)

This invention has to do generally with improved insecticidal compositions and their methods of manufacture, involving as the active principle, sabadilla, which in seed form is an alkaloid or mixture of alkaloids known as veratrine, a crystalline substance highly toxic to plant infestations, particularly the commonly encountered thrip. As an example of prior art relating to sabadilla insecticidal compositions, reference may be had to the Allison Patent No. 2,726,188, issued December 6, 1955, on "Method of Controlling Thrips With Sabadilla Seed Composition."

This application is a continuation of my application Serial No. 29,558, filed May 17, 1960, now abandoned, on "Insecticide and Its Method of Manufacture."

Sabadilla in aqueous suspension has proven to be the most effective thrip control agent. The extent of its use, however, has been restricted by relatively high cost resulting, in part, from limitations according to past methods and compositions in making effectively available the maximum active, i.e. alkaloid, content of the seeds. The present invention provides for materially increased effectiveness in oil and alkaloid extraction from the seeds, and rendering the extracted actives most efficiently useable in the final sprayable insecticidal composition.

The invention has for one of its major objects to provide an important improvement in initial exposure and extraction of oil and alkaloids from sabadilla seeds, by a grinding procedure which results in the several advantages of facilitating and rendering more efficient the physical aspects of the grinding, and simultaneous exposure in the ground product of the active principles for solvent extraction, and transference to the same end, of at least some of the oils and alkaloids to a medium which functions in the nature of a grinding aid, to facilitate physical disintegration of the seed. Further with respect to the multi-purpose effects of the grinding aid, the latter is of a nature such as to display highly desirable suspension properties in the final sprayable composition.

More specifically the invention contemplates initially intergrinding the sabadilla seed with a low bulk density absorptive or adsorptive material in the category of expanded silicas (such as sold under the trade name "Cabasil"), expanded pearlite, and vermiculite, all falling in a bulk density range of about 2 to 15 pounds per cubic foot. The sabadilla seed is interground, as in a hammer mill, with the low density siliceous material to a suitable fineness of the mixture, 80% through 200 mesh standard screen, or finer, being preferred. The effect of the intergrinding is to physically expose and release oils and alkaloids from the seed, which are adsorbed onto and within the filler or grinding aid, the adsorptive properties of the latter being such that it has the capacity for retaining the released oils and alkaloids. By virtue of this property, the filler serves as an efficient grinding aid which tends to prevent or minimize agglomeration of the seed pulp to an oily or viscous mass not efficiently grindable in itself, which would be the condition of the seed if ground in the absence of the grinding aid. Using vermiculite, typically and preferably, the latter functions as an adsorptive partitioning agent which tends to keep largely discrete, the seed hulls, and thus promotes and continues efficient grinding reduction down to the desired fineness.

The interground seed and filler may be used as a preliminary product to be dispersed in a suitable alkaloid solvent such as a freely water-miscible ketone or monohydric alcohol, typically acetone, methanol, ethanol, normal isopropanol or tertiary butanol. The primary function of the aqueous solvent is to dissolve the alkaloid in a concentration most economically effective for thrip killing by spray application of the solution. By at least partial extraction onto or into the filler of the seed alkaloids, the latter are effectively exposed and rendered available for maximum dissolution. Because of its low bulk density, the ground filler tends toward effective dispersion and suspension in the aqueous solvent, so that it will not settle out as a troublesome residue or interfere with free passage of the solution through spray nozzles.

The invention further contemplates supplementing the aqueous solution with any of various additives that may be selected to afford particular benefits. Thus if some thickening of the solution is desired in order to aid suspension of the powder-alcohol-water system, such thickeners as carboxy methyl cellulose, alginates and the like, may be dissolved in the solution in quantities typically up to 3%. It may also be advantageous for pest control, to add a suitable deliquescent agent such as glycerol, diethylene glycol, or a polyhydric alcohol, to keep the applied insecticides from becoming dry or exhibiting a tendency to flake off, and also to make the material easier for the thrip to assimilate. Atlas Chemical Company "Sorbitol (70%)" and molasses have also been used by addition to the final diluted spray composition, as effective diliquescent agents.

Frequently it may be desirable to add to the solution a suitable sweetening agent such as any of the water soluble sweet-tasting monosaccharides, e.g. white or brown sugar, lactose, dextrose, fructose or maltose, or such mixtures as glucose and molasses.

It is desirable that the finished spray composition have a pH between about 4.5 and 8.5, adjustment to which may be had by the addition of a suitable acid, preferably citric acid.

As previously indicated, the method employed in preparing the sprayable product, involves first intergrinding sabadilla seed containing around 25% oils, with e.g. expanded vermiculite, the latter constituting about 20 to 40 weight percent of the mixture, and typically being about 30%. After intergrinding to a fineness of at least about 80% through 200 mesh standard screen, the material then is prepared, as a preliminary product, for introduction to the aqueous solvent.

The interground seed and filler is suspended by agitation in an aqueous solution of 50 to 90% of the solvent, typically 75% isopropanol, the proportion of ground seed and filler to solvent being within the range of about ¾–2 lbs. per gallon of solvent. Uniform dispersion of solids and solute during the mixing, and thereafter while the composition is being sprayed, may be favored by appropriate agitation.

As indicated, thickening of the solution may be accomplished, if required, by the addition of carboxy methyl cellulose or alginate, and to the solution may be added any desired diliquescent and sweeting agents, usually under five pounds per gallon. It is desirable that the final solution be substantially neutral, or at a veriation not greater than a pH between about 4.5 and 8.5.

By virtue of the effective extraction of active principles from the seed and ultimately into the solvent, the latter may be given spray application conservatively and at high kill efficiency.

The following is an illustrative final spray composition made in accordance with the invention:

*Specific Example*

| | | |
|---|---|---|
| Isopropanol alcohol | gal | 60 |
| Interground sabadilla-vermiculite (70% seed), 80% through 200 mesh screen | lbs | 100 |
| Carboxy methyl cellulose | lbs | 4 |
| Expanded silica oxide (dispersant) | lbs | 1 |
| Glycerine | gal | 6 |
| Water | gal | 20 |

From the foregoing it will be apparent that invention is distinguished in its objectives and accomplishments from prior practices or proposals for applying a pesticide to a solid carrier whether the latter serves, as such, for dry dusting or water slurry application of the mixture. One significant purpose contemplated by the invention in intergrinding sabadilla seed with the low density adsorbent is to condition by both adsorption and surface exposure on the adsorbent, the insecticidal values, and principally the alkaloids, for ultimate maximum extraction from the seed and dissolution in the organic solvent. In this manner, I am able to achieve in excess of 85% extraction into the organic solvent of the potential alkaloids in the seed, as distinguished from extractions ordinarily not in excess of 10% when separately ground and admixed sabadilla and solid carrier are dispersed in water, e.g. according to the disclosure of my prior Patent 2,726,188.

In relation to such prior practices as that of intergrinding pesticides, e.g. Aldrin, with solid carrier (see Handbook of Aldrin, Dieldrin & Endrin, Shell Chemical Corporation—1954), to dilute the pesticide, such expedients do not present on the carrier sabadilla alkaloids, or the equivalent, which are soluble in organic solvents such as isopropanol, to the extent of the sabadilla alkaloid solubilities which are responsible for the high degree of extractability attainable in accordance with the invention without excessive solvent useage. The present invention employs the carrier, and the mode of exposing the alkaloids thereon as an intermediary to the final objective of achieving maximum alkaloid extraction into the solvent, as distinguished from the mere use of solids as carriers for a pesticide as in the case of the cited Aldrin useage. And the presence of the adsorbent in the sprayable dispersion is compatible with convenient and efficient spraying by reason of the low bulk density of the adsorbent, and therefore its easy and uniform dispersability in the solution.

As a final observation, the high alkaloid extraction made possible by the invention, necessitates less than 20% useage of high cost sabadilla seed to achieve the same kill potency attainable by the known water extraction from separately ground seed.

I claim:

1. The method that includes grinding together sabadilla seed and low density solid adsorbent acting as a grinding aid to resist agglomeration of the seed hulls and to adsorptively extract on its surface alkaloids from the seed, said adsorbent being of the class consisting of expanded silicas, pearlite and vermiculite, and having a bulk density between about 2 and 15 pounds per cubic foot, and dispersing the resulting ground seed and adsorbent in a solvent, said solvent being an aqueous solution of a material selected from the group consisting of methanol, ethanol, the propanols, tertiary butanol and acetone.

2. The method of claim 1, in which said solvent is an aqueous solution of isopropanol.

References Cited in the file of this patent

UNITED STATES PATENTS 2,726,188 Allison ---------------- Dec. 6, 1955

OTHER REFERENCES

King: U.S. Dept. Agr. Handbook No. 69, 1954, page 306.

Handbook of Aldrin, Dieldrin, and Endrin, Shell Chemical Corporation (1954), pages 21–28.